Dec. 26, 1933.    G. J. ZIEGLER    1,941,124
COTTON PICKING AND CLEANING MACHINE
Filed July 23, 1928    2 Sheets-Sheet 2
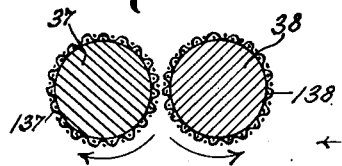
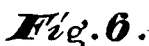
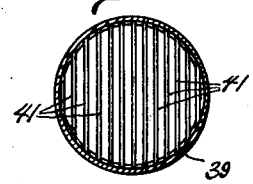
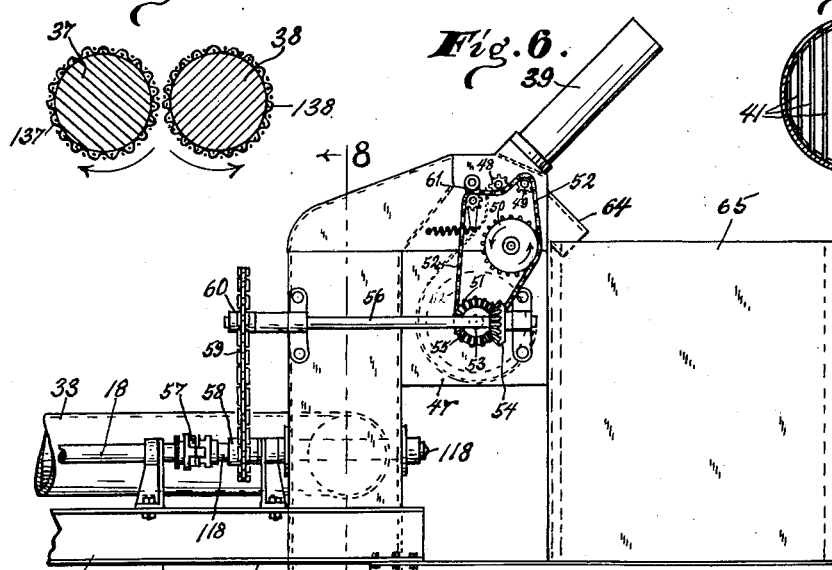
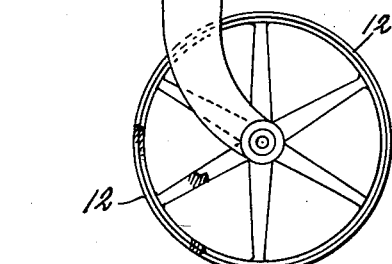
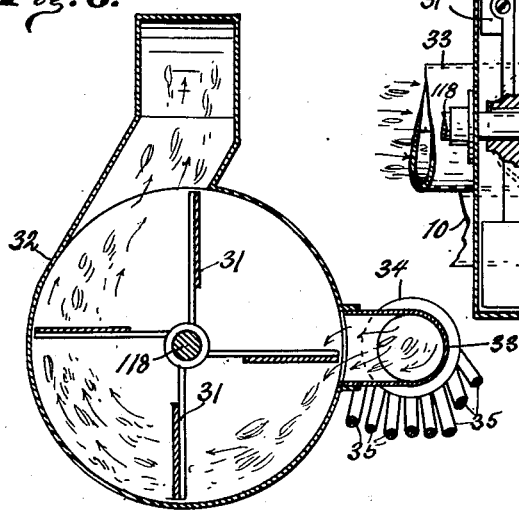
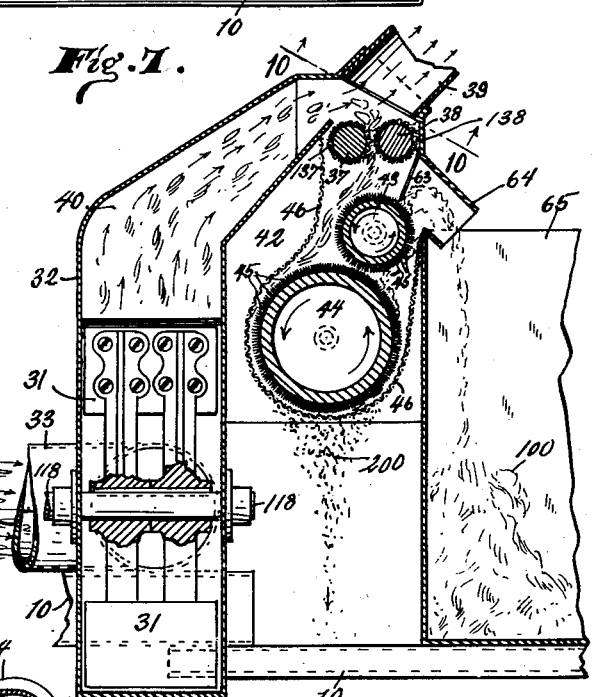
Inventor.
George J. Ziegler.
by
Lockwood & Lockwood,
His Attorneys.

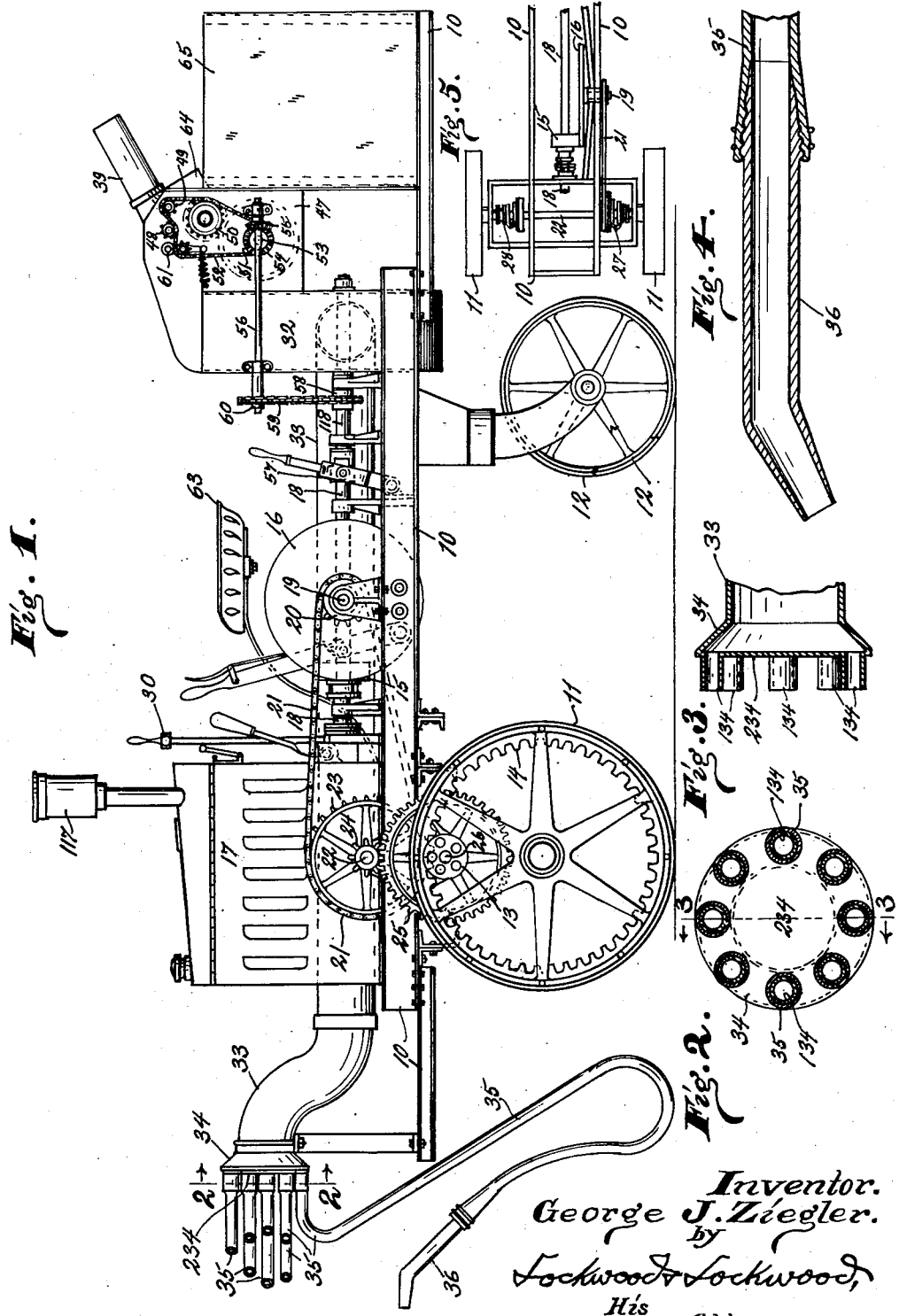

Patented Dec. 26, 1933

1,941,124

UNITED STATES PATENT OFFICE 1,941,124

COTTON PICKING AND CLEANING MACHINE

George J. Ziegler, Los Angeles, Calif., assignor of one-half to Charles J. Heyler, Los Angeles, Calif.

Application July 23, 1928. Serial No. 294,705

1 Claim. (Cl. 19—72)

This invention relates to means for harvesting or picking and cleaning cotton and the principal object of the invention is to provide a simple and efficient means for expeditiously harvesting large fields of cotton with a minimized amount of labor. To that end I provide a machine that can be successively driven forward and backward in a cotton field with means connected therewith for picking the cotton from eight or more rows with the labor reduced to the mere acts of operating the machine and manually directing the picking nozzle toward the rows of cotton, to strip the vines of the cotton and ripened bolls and deliver the mass to the cleaning apparatus where the cotton is automatically cleaned and delivered to a portable bin.

Another object of the invention is to provide a machine adapted to travel at various speeds under its own power which, in addition to picking the cotton as it moves along the cotton rows also gives it an air blast cleaning at a separator to remove a portion of the dust, dirt and dried leaves before it is delivered to a cleaning apparatus where the remainder of the foreign matter is removed from the cotton before it is delivered to a portable bin. In other words the engine power is distributed to locomotion, picking and a double cleaning of the cotton.

A feature of invention is shown in the novel means employed for separating the air from the cotton mass, whereby the air carries off considerable of the dust and dirt or a first cleaning and then the mass is deflected into the crushing rollers from where it passes into the cleaning apparatus for a final cleaning.

Other objects, advantages and features of invention may appear from the accompanying drawings, the subjoined detailed description and the appended claim.

The accompanying drawings illustrate the invention.

Fig. 1 is a fragmental side elevation of a cotton picking and cleaning machine constructed in accordance with the invention showing parts of the flexible hose and nozzles broken away, parts indicated semi-diagrammatically; Fig. 2 is an enlarged cross section on line 2—2, Fig. 1, showing the arrangement of the flexible hose on the suction pipe head; Fig. 3 is a fragmental section on line 3—3, Fig. 2; Fig. 4 is an enlarged fragmental longitudinal section through one of the suction nozzles; Fig. 5 is a semi-diagrammatic plan view of the forward part of the chassis showing the means for driving the front wheels at various speeds and independently of one another, parts shown on a small scale; Fig. 6 is a fragmental side view of the chassis showing it supported on swivel wheels and carrying the fan, separator cotton cleaning apparatus and also a bin for receiving the cotton; Fig. 7 is a fragmental central vertical section through the suction fan compartment, separator cleaning apparatus and bin; Fig. 8 is a fragmental cross section on line 8—8, Fig. 6; Fig. 9 is a cross section through the crushing rollers detached from the separator, and Fig. 10 is an enlarged cross section on line 10—10, Fig. 7.

The cotton picking and cleaning machine is very simple and compact and is mounted on the frame 10 of a small motor vehicle provided with front drive wheels 11 and swivel wheels 12 at the rear end, whereby it can turn sharply at the ends of the rows of cotton and reverse its travel so that as it goes back and forth across the field it will pick the cotton in every row. The drive wheels 11 are driven by roller pinions 13 engaging internal gears 14 secured to the drive wheels, and the pinions engage the gears adjacent their rims whereby relatively slight power is needed for propelling the vehicle.

The vehicle preferably has a friction drive 15—16, whereby the speed may be increased or decreased to accommodate the machine to the varying speeds required in the field. The engine 17 is mounted on the front of the frame 10 and has an exhaust 117 that is high above the cotton in the field to avoid danger of fire; also the engine has a rearwardly extending engine shaft 18 on which the friction pinion 15 is slidable and engages the friction wheel 16, which has a shaft 19 with a sprocket wheel 20 and sprocket chain 21 for transmitting power to a transverse shaft 22 which is in driving connection with the pinion 13.

This driving connection includes the large sprocket wheels 23, pinions 24, large gears 25 on spindle 26 on which the roller pinions 13 are mounted. The propelling mechanism includes clutches 27, 28 for each front wheel that are thrown into and out of operation by the lever 30 and associated means.

The construction and operation of the clutches 27, 28 are old and for the sake of brevity are not shown in detail.

The vehicle is steered by the steering arm 30 diagrammatically shown in Fig. 1, whereby one of the driving wheels can be stopped while the other is driven to make a turn, or vice versa. Also the connection of the lever 30 to the clutches is old and well understood in the art, and for the sake of brevity are not shown or described in detail.

The engine shaft 18 extends rearwardly and drives a rotary exhaust fan 31 mounted thereon in the fan housing 32 and it is connected with a vacuum tube 33 extending towards the front of the machine and terminates in a conical suction head 34 having a plurality of nipples 134 disposed equidistant apart in the base or closed end 234. These nipples are connected by flexible hose 35 to the light picking nozzles 36, and the nozzles are adapted to be carried by workmen in advance of the machine and directed toward the cotton rows for picking the cotton.

The nozzles 36 can be extended close to the ripened unopened cotton bolls so that they remove them as well as the open cotton and the mass is drawn through the tubes and vacuum or fan chamber having an upwardly and rearwardly inclined passage to a separator where the mass is separated from a portion of the dust, dirt and dried leaves; and also the air and falls between a pair of transversely arranged crushing rollers 37, 38 adjacent the air discharge pipe 39 that leads from the vacuum chamber 40. These rollers 37, 38 are for crushing the cotton bolls, and they are covered with a wire screen of ¾" mesh.

These rollers are spaced apart so that their wire covering does not actually engage in crushing the cotton bolls and mass.

A preliminary cleaning appliance that is formed of spaced inclined bars 41 is placed at the base of the exhaust pipe 39 to separate the cotton mass from the air and by means of this air blast the cotton is given its first cleaning as a large portion of the dust, dirt and dried leaves is carried out of the machine by the air. The bars are arranged above the rollers 37, 38 and inclined downwardly so that the cotton mass is deflected from them and falls between the rollers which are arranged and driven to draw the mass downward and crush the unopened cotton bolls, as stated. The rollers 37, 38 have wire screens 137, 138 secured around them that form uneven crushing surfaces well adapted for disintegrating the unopened cotton bolls.

The rollers 37, 38 are arranged to crush the unopened bolls so the cotton can be given a secondary or final cleaning by the cleaning apparatus. This apparatus includes a top drum 43 that is arranged directly under the crushing rollers and is driven to direct the crushed cotton toward the front of the machine so it falls on the large bottom drum 44. The drums 43 and 44 have spines 45 that engage and separate the cotton so it can be more readily cleaned of foreign substance such as the shells of the crushed boll, leaves and the like.

Surrounding these drums and spaced slightly away from the tips of the spines is a wire screen 46, the lower portion of which is concentric to the axis of the drum 44. The cotton mass is thrown by centrifugal force against the wire screen and also dragged over its inner surface down and around the drum 44 to dislodge the dirt and crushed boll shells so they will fall by gravity out of the open bottom of the chamber 42. The drum 44 also carries the cleaned cotton upward toward the roller 43 that picks it up and carries it to the stripper 63 that deflects it into the chute 64 so it falls in the bin 65.

The rolls 37, 38 and drums 43, 44 have spindles journaled through the side walls 47 and to one side of the machine the spindles are extended and provided with the respective sprocket wheels 48, 49, 50, 51 over which a sprocket chain 52 is extended and arranged to drive said rollers and drums in timed relation to one another.

The sprocket wheel 51 which is the driver of chain 52 is keyed to the spindle 53 of the drum 44 and also secured to this spindle is a bevel gear 55 that meshes with a bevel gear 54 secured to a counter shaft 56 that is supported on the wall 47 and housing 32.

The shaft 56 is driven by a shaft 118 that is aligned end to end with the shaft 18 and arranged to be driven through the clutch 57. The shaft 118 carries a sprocket wheel 58 that is connected by a chain 59 to a sprocket wheel 60 on the shaft 56.

A chain tightener 61 of common construction is mounted on the wall 47 and arranged to tighten the chain 52 when in operation, see Figs. 1 and 6.

In operation the machine is driven by a driver mounted on the seat 63 along the rows of a cotton field at a speed best suited for harvesting the cotton; and the seat is arranged so that all of the control levers are accessible to the driver.

The eight nozzles are manipulated by workmen afoot out in advance of the machine who manually direct them toward the cotton which, together with the ripened unopen bolls are dislodged from the stalks and carried to the separator where the mass receives its first cleaning, after which it falls by gravity between the crushing rollers that are arranged at the top inlet end of the cleaning chamber 42.

Where the cotton is thin the workmen can each strip the cotton from the two rows by alternately directing the nozzle first to one and then the other as may be required and the driver can speed up the machine in thin cotton or decrease the speed in heavy growth cotton as may be required so that a very great area can be covered by the machine and a relatively large amount of cotton harvested.

As the cotton is picked by suction it passes through the fan chamber to the separator and then to the crushing rollers where cotton bolls are crushed so as to dislodge the marketable cotton The crushed mass then falls on the spined drum 43 that rolls it downward and throws it outward against the screen 46 and on toward the larger spined drum 44 which lifts the cotton from the drum 43 and continues then to drive the remainder of the dust, dirt, leaves and crushed boll hulls out through the screen.

The cotton is then carried under the large drum 44 and then upward until it is again engaged by the spines 45 on the drum 43 that stripped the cotton from the large drum.

By the foregoing means the cotton can be gathered from the fields in relatively large quantities, cleaned and ready to be baled, and the picking can be consummated without arduous labor and in a relatively short time.

I claim as my invention:

A cleaning apparatus for a cotton picking machine including a fan housing having a fan therein with an inclined air passage that is extended upwardly and rearwardly therefrom, means for feeding field-gathered cotton to said fan so it will be driven upward through said passage, vertical walls arranged rearwardly of said housing and under said passage to form an open bottom cleaning chamber, a large lower spined drum adjacent the lower open end of said chamber, a wire screen having its ends secured adjacent the top end of said chamber and extended downwardly under said drum with its lower portion curved concentric to the longitudinal axis of said drum, a small spined drum arranged above said large drum, a pair of crusher rollers arranged above said small drum, spaced bars in said inclined passage arranged to permit loose dirt and dust to pass with the air out of said passage and thereby give the field gathered cotton a preliminary cleaning and also to deflect the cotton downward between said crusher rollers, means for driving said fan, rollers and drum so the cotton after passing through the crusher rollers is first carried downward against the inner surface of said wire screen under said large drum and then upward on said screen to a bin so that the action of said drums in carrying the cotton along the inner surface of said screen will give it a final cleaning so that foreign substance dislodged therefrom will fall out of the open bottom of said cleaning chamber

GEORGE J. ZIEGLER.